United States Patent
King et al.

(10) Patent No.: US 9,523,618 B2
(45) Date of Patent: Dec. 20, 2016

(54) METHOD AND SYSTEM FOR INSTANTANEOUSLY LOGGING DATA IN AN ELECTRONIC TORQUE WRENCH

(71) Applicant: Snap-on Incorporated, Kenosha, WI (US)

(72) Inventors: Jerry A. King, Hacienda Hts, CA (US); Nathan J. Lee, Escondido, CA (US); Timothy D. Tomlinson, City of Industry, CA (US)

(73) Assignee: SNAP-ON INCORPORATED, Kenosha, WI (US)

( * ) Notice: Subject to any disclaimer, the term of this patent is extended or adjusted under 35 U.S.C. 154(b) by 108 days.

(21) Appl. No.: 13/888,746

(22) Filed: May 7, 2013

(65) Prior Publication Data

US 2014/0331830 A1   Nov. 13, 2014

(51) Int. Cl.
*G01L 5/24* (2006.01)
*B25B 23/142* (2006.01)

(52) U.S. Cl.
CPC .............. *G01L 5/24* (2013.01); *B25B 23/1422* (2013.01); *B25B 23/1425* (2013.01)

(58) Field of Classification Search
CPC .. B25B 23/14; B25B 23/1425; B25B 23/1422; B25B 23/141; B25B 23/1427; B25B 13/46; B23P 19/066
USPC ..... 73/761, 862.23, 862.22, 862.331; 81/479
See application file for complete search history.

(56) References Cited

U.S. PATENT DOCUMENTS

| | | | |
|---|---|---|---|
| 4,558,601 A * | 12/1985 | Stasiek | B25B 23/1425 73/1.11 |
| 5,212,862 A | 5/1993 | Eshghy | |
| 5,303,601 A | 4/1994 | Schönberger et al. | |
| 5,402,688 A | 4/1995 | Okada et al. | |
| 5,521,862 A | 5/1996 | Frazier | |
| 5,903,462 A | 5/1999 | Wagner et al. | |
| 6,405,598 B1 * | 6/2002 | Bareggi | B25B 23/14 73/761 |
| 8,438,957 B2 * | 5/2013 | Wener | B25B 23/1425 73/862.22 |

(Continued)

FOREIGN PATENT DOCUMENTS

| | | |
|---|---|---|
| CN | 102179791 A | 9/2011 |
| DE | 4309016 A1 | 9/1994 |

(Continued)

OTHER PUBLICATIONS

Combined Search and Examination Report for GB 1407786.1 dated Sep. 16, 2014.

(Continued)

*Primary Examiner* — Lisa Caputo
*Assistant Examiner* — Brandi Hopkins
(74) *Attorney, Agent, or Firm* — Seyfarth Shaw LLP

(57) ABSTRACT

An electronic torque wrench is disclosed that instantaneously logs data in real time from a torqueing operation and can later transfer the data to an external device, such as a computer, for further analysis. For example, the computer can create a graph that can be analyzed to determine relevant parameters of the torqueing profile. The parameters of the graph can be analyzed to determine whether the torqueing operation was performed properly for a particular work piece or job task, or to assist users in future torqueing operations.

16 Claims, 5 Drawing Sheets

(56) References Cited

U.S. PATENT DOCUMENTS

2011/0162493 A1\* 7/2011 Anjanappa .......... B25B 23/1425
81/479
2012/0006161 A1 1/2012 Chen

FOREIGN PATENT DOCUMENTS

| EP | 1068931 | 1/2001 |
| JP | 2006320984 | 11/2006 |
| JP | 2012157924 A | 8/2012 |

OTHER PUBLICATIONS

Australian Government IP, Patent Examination Report No. 1; dated Apr. 29, 2015; 3 pages.
Canadian Intellectual Property Office, Examiner's Report dated Aug. 3, 2015; 3 pages.
Taiwan Search Report, English Translation, dated Nov. 27, 2015; 1 page.
Taiwan Office Action, dated Dec. 4, 2015; 6 pages.
Chinese Office Action dated Dec. 1, 2015 (6 pages) and English translation.
United Kingdom Intellectual Property Office Examination Report dated Jun. 29, 2016; 3 pages.
State Intellectual Property Office of P.R. China, The First Office Action dated Sep. 20, 2016; 11 pages.

\* cited by examiner

METHOD AND SYSTEM FOR INSTANTANEOUSLY LOGGING DATA IN AN ELECTRONIC TORQUE WRENCH

TECHNICAL FIELD OF THE INVENTION

The present application relates to systems for logging data from an electronic torque wrench. More particularly, the present application relates to systems for instantaneously logging data in real time from an electronic torque wrench and using the data for joint diagnostic and analysis.

BACKGROUND OF THE INVENTION

Electronic torque wrenches are used to apply torque to a work piece and to measure the torque applied to the work piece by the wrench. These wrenches can indicate to the user when the work piece has been torqued to the appropriate torque value, e.g., 100 ft-lb. Some electronic torque wrenches also measure the angle at which the work piece has been rotated.

Some fasteners require a particular fastening procedure, such as applying a certain amount of torque and/or angle before the final torque and/or angle value are achieved to ensure proper tightening. For example, an aerospace fuel line nut requires a specific rundown angle, seating torque, and final torque and angle to determine if the joint seats correctly. However, the optimal torqueing operation is not always known and must be ascertained through trial and error. Therefore, there exists a need for a torque application tool that can monitor and record the amount of torque and/or angle applied to a work piece in real time, and then transfer this data to an external device for further review and analysis to ascertain the optimal torqueing procedure.

SUMMARY OF THE INVENTION

The present application discloses an electronic torque wrench that logs data in real time for a torqueing operation and transfers the data to a computer for further analysis. For example, the computer can plot the data on graphical form and analyze the graph to determine relevant parameters of the torqueing profile. An optimal torqueing profile can then be determined from the graph parameters by analyzing whether the torqueing operation was performed properly, or to assist users in future torqueing operations.

In particular, the present application discloses a tool including a head coupled to a sensor adapted to sense torqueing parameters of a torqueing operation applied to a work piece, a memory operably coupled to the sensor and adapted to receive a signal including data relating to the torqueing parameters at a predetermined frequency and further adapted to store the data, an interface adapted to receive a sampling interval indicating the predetermined frequency, and a transceiver adapted to interface the tool with an external device for analysis of the data.

Also disclosed is a method of analyzing torqueing data including providing a tool having a sensor adapted to sense torqueing parameters of a torqueing operation applied to a work piece, establishing a frequency at which the torqueing parameters are stored in a memory of the tool, performing the torqueing operation on the work piece, storing data representing the torqueing parameters in the memory at the frequency, transmitting the data from the tool to an external device, and analyzing the data with the external device.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

Figure 1:
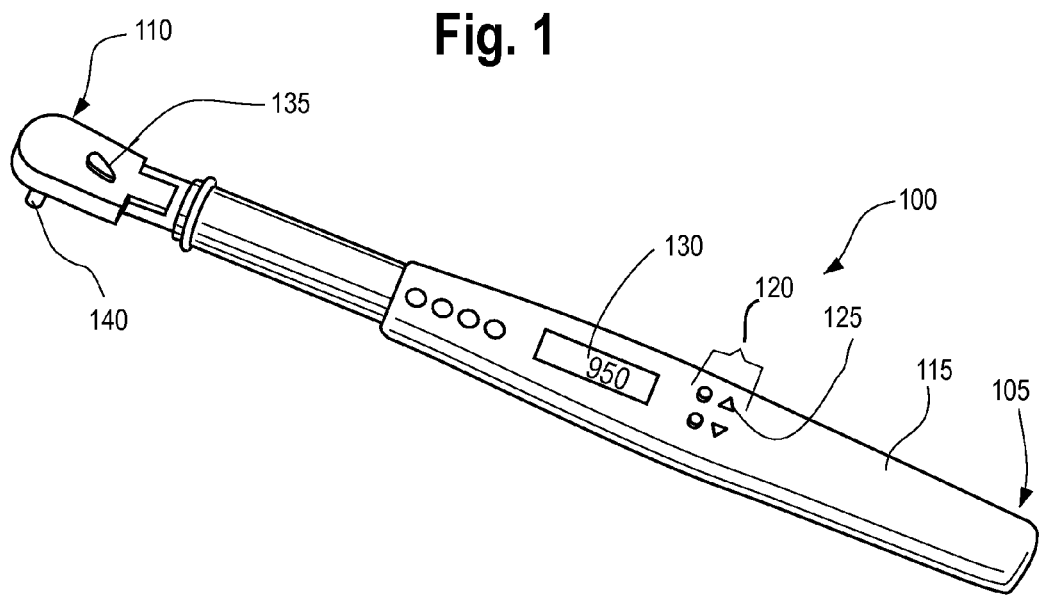
FIG. 1 is a side perspective view of a tool according to an embodiment of the present application.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated.

The present application discloses a tool adapted to apply torque to a work piece, such as an electronic torque wrench, adapted to record data in real time from a torqueing operation and then transfer the data to an external device, such as a computer, for further analysis to create an optimal torqueing procedure. For example, the computer can create a graph that can be analyzed to determine relevant parameters, such as torque and/or angle application amount or duration, of the torqueing profile. The parameters of the graph can be analyzed to determine whether the torqueing operation was performed properly for a particular work piece or job task.

As shown in FIG. 1, a tool 100 can include a handle 105 at a first end and a head 110 adapted to transfer torque to a work piece at a second end opposite the first end. The handle 105 can include a grip 115 allowing the user to better grasp the tool 100 during operation. An interface 120 with at least one button 125 can also be disposed on the tool 100 for allowing the user to input instructions or other information into the tool 100. The tool 100 can also include a display 130 for displaying information to the user. The head 110 can include a reversing lever 135 for reversing the drive direction of the tool 100, and a sensor 140 for sensing torque and/or angle parameters of the tool 100.

The tool 100 can sense parameters with the sensor 140, for example, torque amounts and/or angle values and duration of the torqueing application applied to a work piece. Those values can then be logged in real time or at a predetermined frequency and stored in a memory such as a non-volatile memory, and transmitted through any known means to an external device, such as a personal computer for further analysis and review. The logged data can then be plotted and analyzed with the external device to determine an optimal torqueing profile to apply to future torqueing operations for that particular work piece or job task, or to determine that a correct torqueing profile was applied during the recorded operation.

The interface 120 allows the user to input information or commands into the tool 100. By way of example, the interface 120 can include a keyboard, mouse, touch screen, audio recorder, audio transmitter, member pad, or any other device that allows for the entry of information from a user. As shown in FIG. 1, in an embodiment, the interface 120 can include buttons 125, e.g., up/down control buttons and an "enter" key.

In an embodiment, the display 130 can display various information for the user to view and interpret, for example, text or graphics, or information entered into the interface 120. By way of example, the display 130 can include a liquid crystal display (LCD), organic light emitting diode (OLED) display, plasma screen, or any other kind of black and white or color display that will allow the user to view and interpret information.

Figure 2:
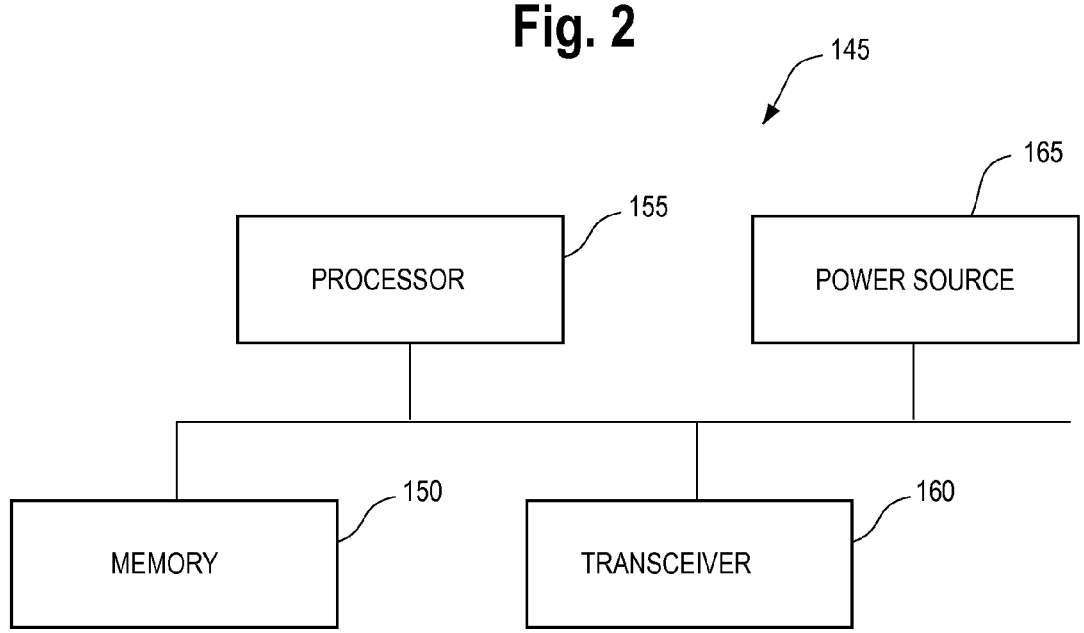
FIG. 2 is a schematic diagram of a control unit in accordance with an embodiment of the present application.

FIG. 2 is a schematic diagram of a control unit 145 in accordance with an embodiment of the present application. In some embodiments, the control unit 145 includes a memory 150 for storing data and/or computer programs, a processor 155 for controlling operations of the control 145, and a transceiver 160 for transmitting and receiving data relating to the tool 100 to external sources, such as a personal computer. The control 145 can also have a power source 165, for example a battery, for powering operations of the control 145 and the tool 100 in general. The above components of the control 145 can be coupled together, directly or indirectly, by any known means.

In an embodiment, the memory 150 can store data and/or computer programs for use with the tool 100. For example, the memory 150 can store a program that logs torqueing parameters, such as angle and/or torque values and duration of application recorded at a predetermined sample frequency, termed the "sample interval". The memory 150 can also store an operating system for the control unit 145 or any other software or data that may be necessary for the tool 100 to function. Without limitation, the memory 150 can include any non-transitory computer-readable recording medium, such as a hard drive, DVD, CD, flash drive, volatile or non-volatile memory, RAM, or any other type of data storage.

The processor 155 facilitates communication between the various components of the tool 100 and controls operation of the electrical components of the tool 100. The processor 155 can be any type of processor or processors, for example, a desktop or mobile processor, embedded processor, a microprocessor, a single-core or a multi-core processor.

The transceiver 160 can be any device capable of transmitting data from the tool 100 or capable of receiving data within the tool 100 from an external data source. By way of example, the transceiver 160 can be any type of radio transmission antenna, cellular antenna, hardwired transceiver, or any other type of wired or wireless transceiver capable of communicating with an external device. In an embodiment, the transceiver 160 is a USB port capable of connection with a USB cable or USB flash drive, which is connected or connectable to a personal computer or other external device.

The power supply 165 can be any source of electrical or mechanical power that can power the control 145. In an embodiment, the power supply 165 is a battery. However, the power supply 165 can be any component that provides power, including a battery, fuel cell, engine, solar power system, wind power system, hydroelectric power system, a power cord for attachment to an electrical socket, or any other means of providing power.

Figure 3:
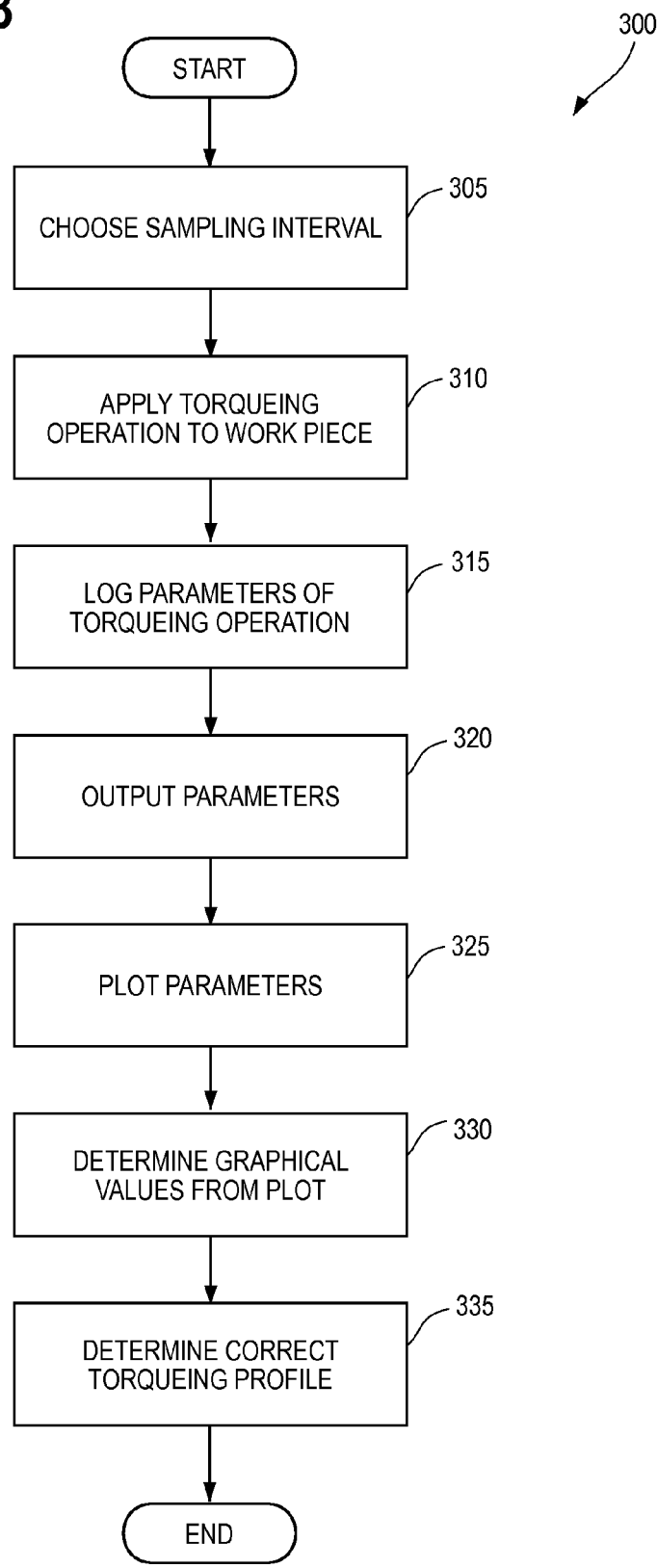
FIG. 3 is a flowchart illustrating a process in accordance with an embodiment of the present application.

FIG. 3 is a flowchart illustrating a process 300 according to an embodiment of the present application. As shown, the process 300 begins and proceeds to step 305, where the user can choose the interval at which the torqueing data is measured, e.g., the interval at which the torque and/or angle values are sensed by the sensor 140 and recorded to memory. The sampling interval is typically fixed but can also vary within the same torqueing operation, or from one torqueing operation to another. In an embodiment, the sampling interval is one sample every four milliseconds (250 hertz), but any sampling interval can be implemented within the spirit and scope of the present application. To choose a sampling interval, the user can either manually input the selection or choose from a preset selection.

The process then proceeds to step 310, where a torqueing operation is applied to the work piece. For example, the user can apply a torque of 100 ft-lb to the work piece, and in step 315, the torque and/or angle values of the work piece can be logged into the memory 150 for later retrieval. In an embodiment, the torque and angle values are logged at the same sampling interval, for example, one sample every four milliseconds (250 hertz) as described above. However, the torque and angle values can be measured and logged at different interval values, for example, logging one torque value every four milliseconds (250 hertz) but logging one angle value every sixteen milliseconds (62.5 hertz). In this example, the user could still select a four millisecond (250 hertz) sampling interval via the interface 120, but the angle and torque parameters would be logged at a specified ratio based on the selected sampling interval.

Once the parameters are logged as data in the memory 150, the data can be output in step 320 through the transceiver 160 in any known manner. For example, the data can be transferred wirelessly through the transceiver 160 to, for example, a personal computer for analysis. It will be appreciated that the data can be transmitted wirelessly or by any wired means, for example a USB interface.

Figure 4:
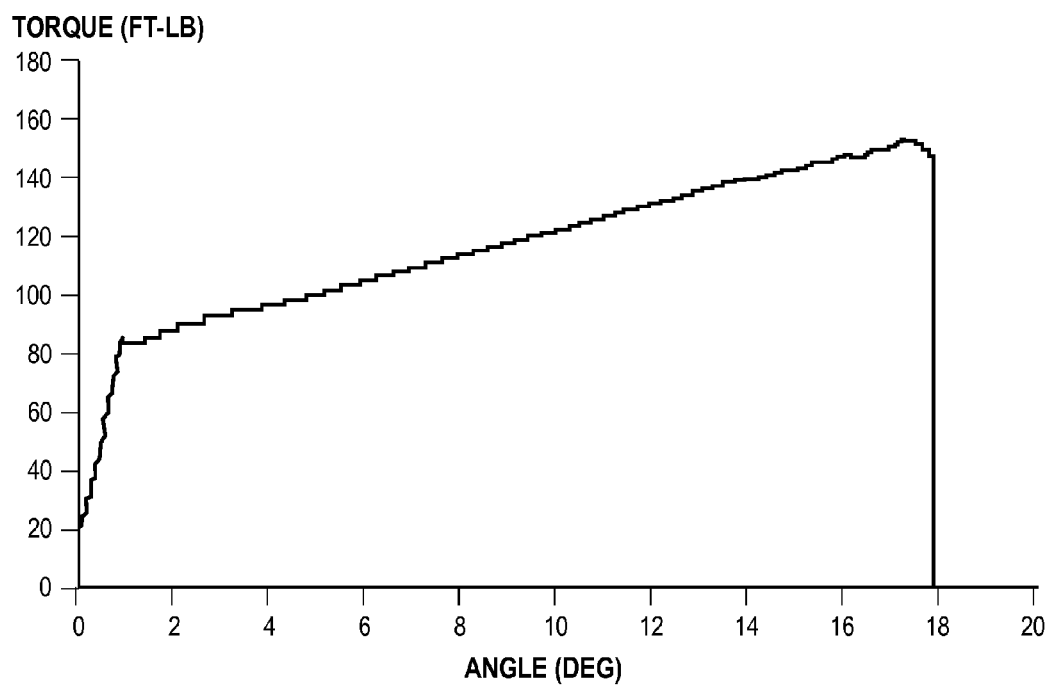
FIG. 4 is an illustration of an exemplar torque/angle graph in accordance with an embodiment of the present application.
Figure 5:
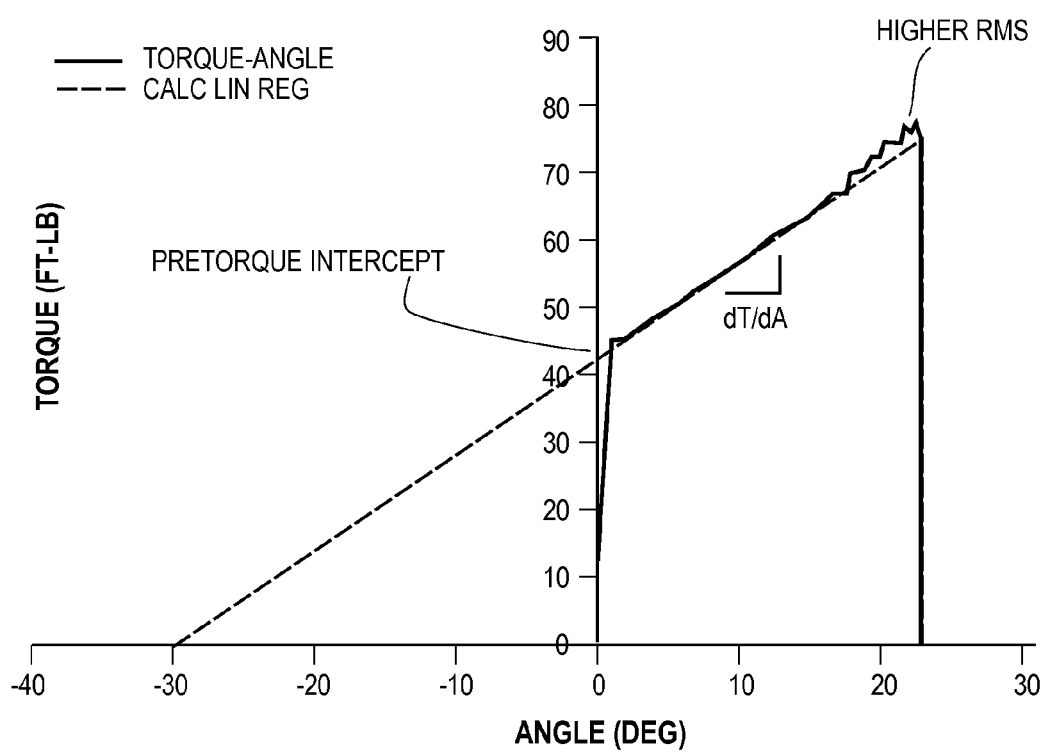
FIG. 5 is another illustration of an exemplar torque/angle graph in accordance with an embodiment of the present application.

The parameters are then plotted in step 325 for analysis. For example, the parameters can be plotted with the angle on the X-axis and the torque value on the Y-axis, as shown in FIGS. 4 and 5. Although the units are shown as degrees and ft-lb, any known units of data can be implemented. Also, the data shown as plotted in FIGS. 4 and 5 can be exported to an Excel spreadsheet or otherwise made available to the user on the external device.

In step 330, various graphical values can be determined from the plot of step 325, and from those values, the correct torqueing profile can be determined in step 335. For example, as shown in FIG. 5, the difference in torque as compared to the difference in angle (dT/dA) can be calculated as the slope of the torque/angle graph. FIG. 5 shows that this slope flattens out after the pretorque intercept and "unflattens" toward the end of the torqueing operation, where a higher root mean square (RMS) can be found.

In accordance with the process 300, a linear regression can be calculated (shown in FIG. 5 as the line Calc Lin Reg) to determine the dT/dA slope. For example, the inventors of the present application discovered that the flattened line in FIG. 5 typically begins at about 4° and extends until about 90% of the values are logged. Prior to the 4° mark, the torque and angle values are typically scattered and not statistically relevant for determining the correct torqueing profile. This portion of the graph is termed the "pretorque zone." A root mean square difference can also be determined between the torque-angle line and the calculated Calc Lin Reg line using any known calculations. This data can then be used to either determine the correct torqueing profile to apply to future work pieces or to determine whether the existing work piece has been properly torqued. The operator can be notified by any visual (e.g. LED or LCD), tactile (e.g. vibration) or audible signal that the fastener was properly or improperly torqued.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A tool having a head adapted to apply torque to work pieces, comprising:
   a sensor operably coupled to the head and adapted to measure, at a predetermined frequency, respective amounts of torque applied to a first work piece, thereby creating torque measurements respectively representing the amounts of torque applied to the first work piece at the predetermined frequency;
   a memory operably coupled to the sensor and adapted to receive and store data including the torque measurements;
   and
   a transceiver operably coupled to the memory and adapted to:
      transmit the data to an external device external to the tool and adapted to determine an optimum torqueing procedure for the first work piece based on the data, and
      receive from the external device the optimum torqueing procedure for a future torqueing operation of a second work piece similar to the first work piece.

2. The tool of claim 1, wherein the sensor is further adapted to measure, at the predetermined frequency, respective amounts of angular rotation applied to the first work piece, thereby creating angular measurements respectively representing the amounts of angular rotation applied to the first work piece at the predetermined frequency, and wherein the data further includes the angular measurements.

3. The tool of claim 2, wherein the predetermined frequency includes first and second values, wherein the second value is a multiple of the first value, wherein the torque measurements are respectively stored in the data at a torque frequency corresponding to the first value, and the angular measurements are respectively stored in the data at an angle frequency corresponding to the second value.

4. The tool of claim 1, wherein the transceiver wirelessly transmits the data to the external device.

5. A method of analyzing torque application data for a tool having a head adapted to apply torque to work pieces, a sensor operably coupled to the head and adapted to measure amounts of the torque applied to the work pieces, and a memory operably coupled to the sensor, comprising:
   establishing a frequency at which respective measurements of the amount of torque applied to a first work piece are stored in the memory;
   applying the torque to the first work piece;
   storing data including the respective measurements of the amount of torque applied to the first work piece in the memory at the frequency;
   transmitting the data from the memory to an external device;
   analyzing the data, with the external device, to determine an optimum torqueing procedure for the first work piece; and
   receiving, from the external device, procedure data including the optimum torqueing procedure in the memory for a future torqueing operation of a second work piece similar to the first work piece.

6. The method of claim 5, wherein the measurements of the amount of torque applied to the first work piece respectively include measurements of angular rotation applied to the first work piece.

7. The method of claim 6, wherein the frequency includes first and second values, wherein the second value is a multiple of the first value, and wherein the respective measurements of the amount of torque applied to the first work piece are respectively stored at torque frequencies corresponding to the first value, and the respective measurements of angular rotation applied to the first work piece are respectively stored at angle frequencies corresponding to the second value.

8. The method of claim 6, wherein the step of analyzing the data includes plotting the data on a graph.

9. The method of claim 8, wherein the graph includes first and second axes, wherein the measurements of angular rotation are plotted on the first axis and the measurements of the amount of torque are plotted on the second axis.

10. The method of claim 9, further comprising determining a slope of at least a portion of the graph.

11. The method of claim 10, further comprising establishing a first value to begin the step of determining the slope, and establishing a second value to end the step of determining the slope.

12. The method of claim 11, wherein the first value is an angular rotation of about 4 degrees.

13. The method of claim 12, wherein the second value is an angle measured when a torqueing operation of the first work piece is approximately 90% complete.

14. The method of claim 5, wherein the frequency is selected prior to applying the torque to the first work piece.

15. A tool having a head adapted to apply torque to work pieces, a sensor operably coupled to the head and adapted to measure amounts of torque applied to the work pieces, and a transceiver adapted to communicate with an external device that is adapted to determine an optimal torque procedure, comprising:
   a processor including instructions to:
      store, in a memory operably coupled to the sensor, data including torque measurements of respective amounts of torque applied to a first work piece measured by the sensor at a predetermined frequency;
      transmit, via the transceiver, the data to the external device;
      receive from the external device, via the transceiver, and store in the memory the optimal torque procedure; and
      use the optimal torque procedure for a future torqueing operation of a second work piece similar to the first work piece.

16. An external device adapted to communicate with a tool having a head adapted to apply torque to work pieces, a sensor operably coupled to the head and adapted to measure amounts of torque applied to the work pieces, comprising:
    a processor including instructions to:
        receive, from the tool, data including torque measurements of respective amounts of torque applied to a first work piece by the head, measured at a predetermined frequency by the sensor;
        determine, based on the data, the optimal torque procedure for the first work piece; and
        transmit to the tool the optimal torque procedure to be used by the tool for a future torqueing operation of a second work piece similar to the first work piece.

\* \* \* \* \*